United States Patent

Aoki

[11] Patent Number: 5,229,755
[45] Date of Patent: Jul. 20, 1993

[54] INDICATION DISPLAY UNIT FOR VEHICLES

[75] Inventor: Kunimitsu Aoki, Susono, Japan

[73] Assignee: Yazaki Corporation, Tokyo, Japan

[21] Appl. No.: 884,292

[22] Filed: May 13, 1992

Related U.S. Application Data

[63] Continuation of Ser. No. 685,175, Apr. 15, 1991, abandoned, which is a continuation of Ser. No. 262,378, Oct. 25, 1988, abandoned.

[30] Foreign Application Priority Data

Oct. 26, 1987 [JP] Japan .................. 62-162518[U]
Oct. 26, 1987 [JP] Japan .................. 62-162519[U]

[51] Int. Cl.$^5$ ............................... G09G 3/02
[52] U.S. Cl. ............................... 340/705; 353/13
[58] Field of Search ........... 340/705, 980; 353/13, 353/14; 358/103, 104, 174, 250, 93; 359/13, 630, 632

[56] References Cited

U.S. PATENT DOCUMENTS

| | | | |
|---|---|---|---|
| 3,457,006 | 7/1969 | Brown et al. | 340/705 |
| 4,742,389 | 5/1988 | Schiffman | 340/980 |
| 4,775,218 | 10/1988 | Wood et al. | 340/705 |
| 4,831,366 | 5/1989 | Iino | 353/14 |
| 4,837,551 | 6/1989 | Iino | 353/14 |
| 4,908,611 | 3/1990 | Iino | 340/705 |
| 5,099,299 | 3/1992 | Aoki | 340/705 |

FOREIGN PATENT DOCUMENTS 50-48576 5/1975 Japan .

Primary Examiner—Ulysses Weldon
Assistant Examiner—M. Fatahiyar
Attorney, Agent, or Firm—Nikaido, Marmelstein, Murray & Oram

[57] ABSTRACT

Various indication display units, for vehicles provided with a head-up display including an indication projector with a display device at the ceiling of a vehicle and a reflecting device forwardly of a driver seat, have been introduced so far due to the fact that there are increasing requirements for space for the installation of many kinds of indicators in vehicles. The problem remains that the displayed image on the reflecting device can hardly be seen on the indication display unit of the conventional type when external strong rays of light are radiated to the above reflecting surface from outside the vehicle through the windshield, and a part of the ceiling reflected on the reflecting device together with the indicating image projected from the projector also causes a bad effect to the displayed image when the vehicle is illuminated by another vehicle following there behind. The indication display unit according to the present invention provides a reflected image of good quality excluding the above bad effects on the displayed image to be reflected on the reflecting device caused by external light radiated from outside the vehicle, by forming the projector more profoundly than the ceiling surface.

6 Claims, 4 Drawing Sheets

INDICATION DISPLAY UNIT FOR VEHICLES

This application is a continuation application of prior application Ser. No. 685,175, filed on Apr. 15, 1991, now abandoned, which is a continuation of originally filed application Ser. No. 262,378 filed on Oct. 25, 1988, now abandoned.

BACKGROUND OF THE INVENTION

1. Field of the Invention

The present invention relates to an indication display unit for vehicles which provides a driver with the whole information about the vehicle such as its velocity, revolution frequency of the engine, left-fuel quantity, clock, and other various alarm devices by projecting an image which will appear on a display device, to the reflecting surface on a reflecting means which is located forwardly of a driver seat.

2. Description of the Prior Art

The use of display units, provided with a projecting device, have been recently increased in order to save space for installation of an increasing number of display devices required for providing a driver with various driving information.

As an indication display unit for vehicles of this type, there is one in which a display device, included in an indicating image projector, is mounted inside the dashboard with its display surface facing upwards to a reflecting means, such as a semi-translucent mirror inclining towards the driver seat, where the reflecting means is installed on the dashboard, whereby a displayed image projected from the above display device of the indicating image projector is reflected on the surface of the reflecting means so as to be sighted there, that is, to be sighted ahead of the windshield of the vehicle (Japanese Utility model No. 50-48576).

However, the displayed image on the reflecting means can hardly be seen on the indication display unit of this conventional type when external strong rays of light are radiated to the above reflecting surface from outside the vehicle through the windshield, and another problem still remains that since other indication meters or devices are also installed in the dashboard, only limited space is available for installing the above type of indication display unit.

On the other hand, another kind of indication display device has also been introduced in order to avoid the above problems in which the display device is installed at the inner ceiling of the vehicle, whereby the displayed image projected therefrom is reflected by the reflecting means located forwardly of the driver (Japanese Utility Model No. 62-056666).

However, the indication display unit comprising an indicating image projector and a reflecting means normally adopts a high-bright fluorescent tube for its display device contained in the above projector so as to intensify the contrast of the reflected image on the reflecting means, whereby the scattered rays of light from the displaying surface 11a of the indicating image projector 11 are radiated to the ceiling surface 12 as shown in FIG. 4a. By this reason, the scattered light reflecting area 12a which is brightly illuminated is generated in the ceiling surface around the image projector 11 as shown in FIG. 4(b), and consequently the above area is also reflected on the reflecting surface, deteriorating the quality of the displayed image to be sighted thereon.

Furthermore, as shown in FIG. 10a, when a vehicle A following behind the vehicle B radiates a high-positioned beam from its head lamp, the ceiling of the vehicle B is illuminated through the rear window thereof, and also even when the beam from the vehicle A is low-positioned, the above ceiling thereof is also illuminated if vehicle B starts descending a slope.

Therefore, when a head-up display is installed for sighting of the image on the reflecting means projected from the display device of the indicating image projector, only the image projected therefrom is normally reflected as shown in FIG. 8(a), but once the vehicle is illuminated by another one following therebehind through its rear window, the projector 10 storing the display device and the ceiling surface 40 are illuminated as shown in FIG. 9, so that the illuminated images 10' and 40' of the indicating image projector 10 and the ceiling surface 40 respectively are reflected altogether around the reflected image, resulting in that the image of the indication can hardly be seen.

The present invention relates to an indication display unit for enabling a driver to sight an image on the reflecting means projected from the display device mounted on the ceiling of the vehicle, and its principal object is to provide a reflected image of good quality excluding bad effects on the displayed image to be reflected on the reflecting means caused by external light radiated from outside the vehicle.

SUMMARY OF THE INVENTION

An indication display unit for vehicles according to the present invention comprises a reflecting device located forwardly of a driving seat for reflecting a displayed image projected from the above display device so as to be sighted behind the reflecting board, and is characterized in that the display device contained in the indicating image projector is mounted at the ceiling inside the vehicle and that the ceiling surface within the scattered light reflecting area which can be reflected on the reflecting surface together with the indication displaying surface of the above display device is arranged more profoundly than the surrounding area thereof.

In the structure above, as the ceiling surface within the reflectable scattered light reflecting area which can be reflected in the reflecting surface is relatively less protruding than the surrounding area thereof, the scattered light from the displaying surface of the display device is not radiated to the ceiling surface, and even when the ceiling area is radiated by the beam of light from therebehind, the range to be reflected on the reflecting means is shaded, so that only the indicating image of the display device is reflected.

DETAILED DESCRIPTION OF THE EMBODIMENTS

The above object of the present invention will become apparent on reading the following detailed description of the embodiments with reference to the accompanying FIGS. 1 to 10.

THE FIRST EMBODIMENT

Figure 1:
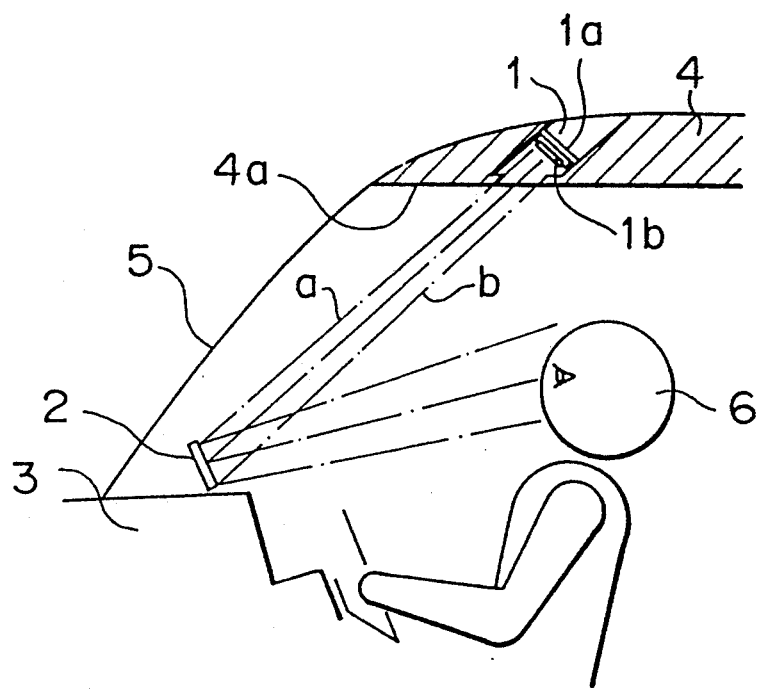
FIGS. 1 and 2 show the first embodiment according to the present invention.
Figure 2:
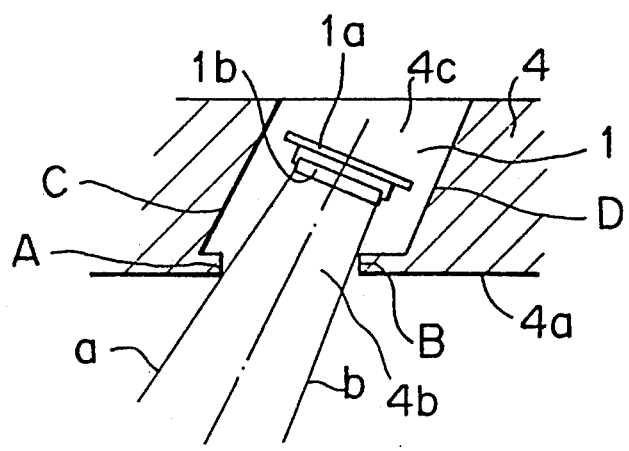

FIGS. 1 and 2 show the first embodiment according to the present invention. In the figure, an indicating image projector, is constructed incorporating a fluorescent tube 1b as a display device to an activating circuit 1a, a reflecting means 2 is mounted on a dashboard 3 and is made of a transmissive type board so as not to hamper the driver's sight in the forward direction ahead of a windshield 5.

The fluorescent tube 1b of the display device indicates the information such as velocity, and the displayed image thereof is reflected by the reflecting board 2 so that the driver can see it.

By this structure above, the inner space of the dashboard 3 can be utilized effectively.

As shown in FIG. 2, the indicating image projector 1 is structured in such a way that the displaying surface of the fluorescent tube 1b is located inside the ceiling surface 4a of the ceiling part 4, and the opening 4b through which the rays of lights from the fluorescent tube 1b are radiated is structured smaller than the inner size of the inner space 4c in which the display device is stored. That is, the edges A, B of the opening 4b are accessed to the lines a and b which connect both ends of the displaying surface of the flourescent tube 1b and those of the reflecting means, and simultaneously, each of the side surfaces C and D of the above inner space 4c are located as far as possible from each of the above lines a and b respectively.

Figure 3:
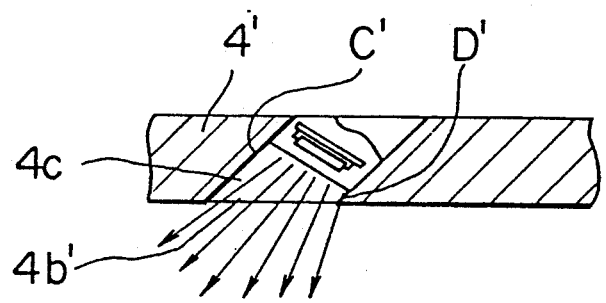
FIG. 3 is a perspective view showing the reflected light inside the ceiling of a vehicle.
Figure 4A:
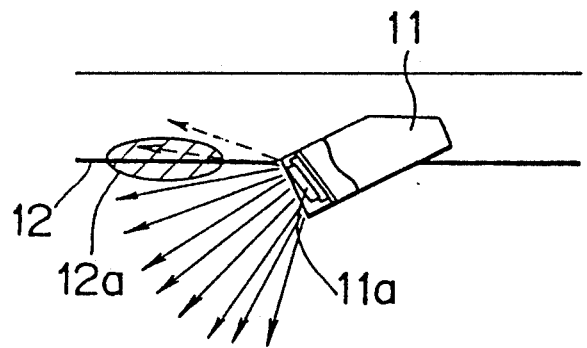
FIGS. 4a-4b are perspective views showing the reflected light on the ceiling surface.
Figure 4B:
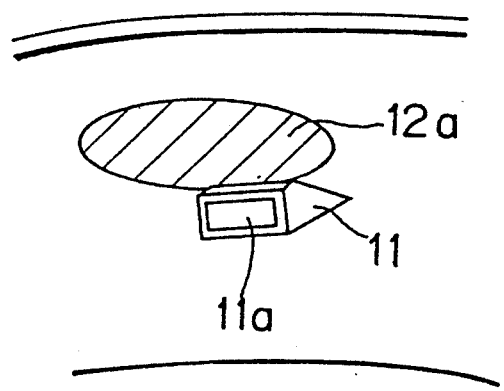

By this structure above, the displayed image of the fluorescent tube 1b can be sighted by the driver through the reflecting means 2, and at the same time as shown in FIG. 3 the reflection of the side surfaces C' and D' can be prevented, which normally does not occur in the case that the size of the opening 4b' of the ceiling part 4' and that of the above C' and D' of the inner space 4c are the same.

As above, the reflection of scattered light normally generated near the displayed image is prevented, whereby the reflected image on the reflecting means can be of a greatly improved quality.

THE SECOND EMBODIMENT

Figure 5:
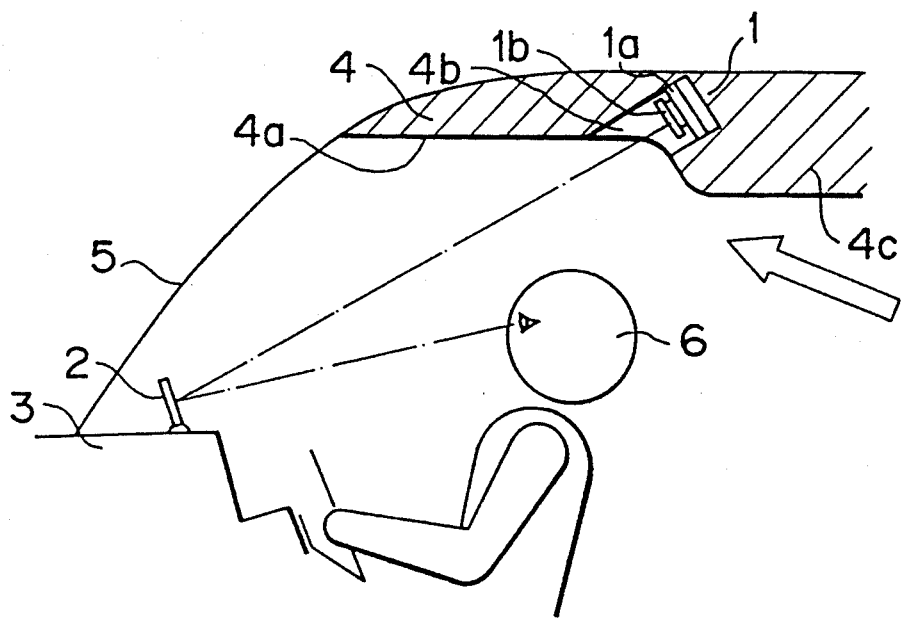
FIGS. 5 and 6 show the second embodiment according to the present invention.
Figure 6:
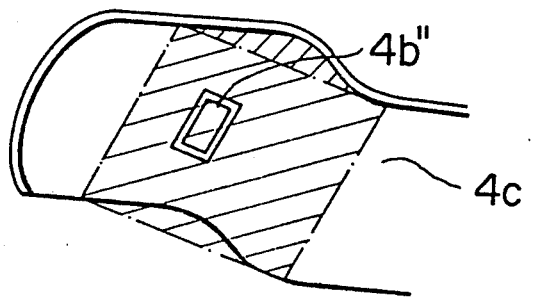

FIGS. 5 and 6 show the second embodiment according to the present invention.

In this embodiment, the structure in which the display device is mounted in the recessed part of the ceiling the same as the first embodiment, although in this embodiment, the downwardly extending projection 4c is formed behind the opening 4b'' near the displaying surface of the fluorescent tube 1b at the ceiling part.

By this structure, even when the ceiling area is illuminated by the beam of light through the rear window as shown in FIG. 6, the near area of the opening 4b'' is shaded by the projection 4c.

The height and width of the projection 4c are settled in such a way that the ceiling part and the displaying surface of the indicating image projector 1, which are both to be reflected on the reflecting board 2, are shaded.

Figure 8A:
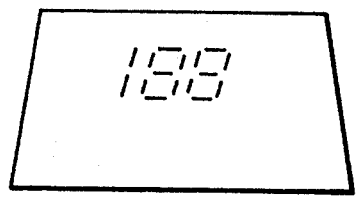
FIGS. 8a and 8b are perspective views respectively showing the image sighting state on the reflecting surface.
Figure 9:
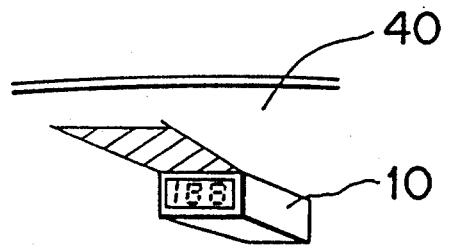
FIG. 9 shows the state in which the ceiling surface is brightly illuminated by the beam of light radiated through the rear window.
Figure 8B:
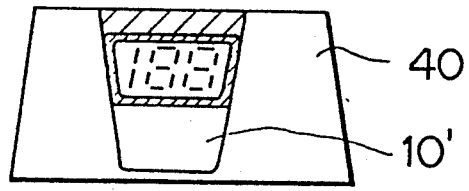
Figure 10A:
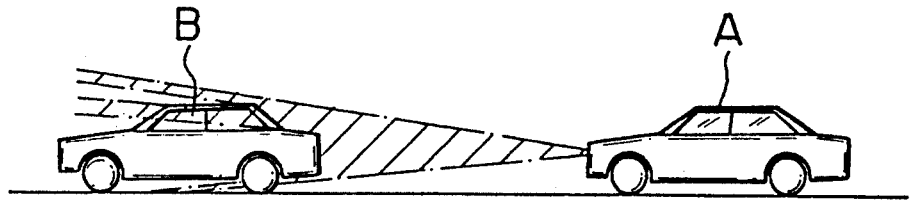
FIGS. 10a–10b are perspective views that show the effect caused by another vehicle following behind.
Figure 10B:
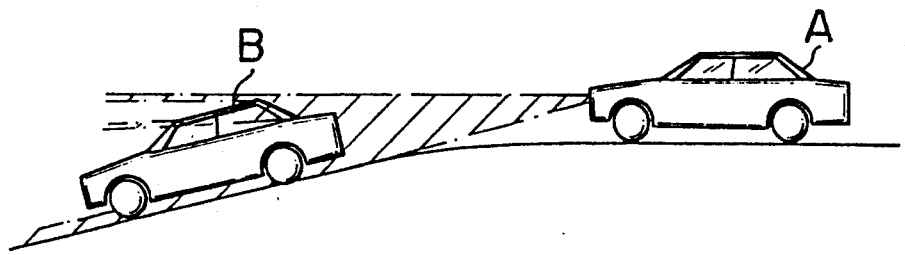

Therefore, even when the ceiling part is illuminated by the beam of light from of the head lamp of the following vehicle through the rear window as shown in FIG. 10, only the displayed image of the fluorescent tube 1b is reflected on the reflecting surface 2 as shown in FIG. 8a.

Figure 7:
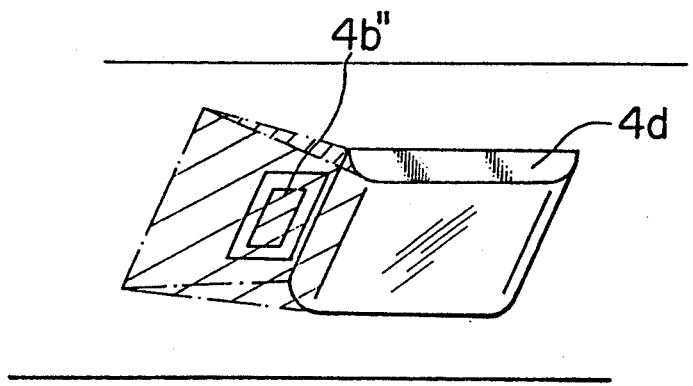
FIG. 7 shows another case concerning the protruded portion which is slightly different from the second embodiment.

In the above embodiment, the projection 4c is structured so that the near area of the indicating image projector 1 is located more profoundly than the surface surrounding thereof, but as shown in FIG. 7, a ceiling unit 4d storing a room light, an air cleaner or the like can also be mounted at the ceiling.

In this case, the opening 4b'' is mounted very near the forward edge of the ceiling unit so that the projector is shaded.

In the first and second embodiments, the reflecting means can be mounted in the instrument panel surface or the like as well as on the dashboard.

What is claimed is:

1. An indication display unit for vehicles enabling a driver to sight an indicating image comprising:

an image projector means including an indicating means and a display device, said image projector means is arranged completely inside a recessed hole within a ceiling of a vehicle, an opening of said recessed hole, into which said image projector means is located, is smaller in size than an inner space of the recessed portion hole, said image projector means is constructed in such a way that a part of said ceiling is downwardly projecting behind said opening but near said image projector means; and a reflecting means located forwardly of a driver seat to reflect the indicating image, said indicating image is directly projected from said image projector means to said reflecting means.

2. An indication display device for vehicles as claimed in claim 1, wherein edges of said opening are extended to two lines formed by connecting both ends of a surface of said image projector means and said reflecting means, and simultaneously, each surfaces of said inner space thereof is located as far as possible from each of said lines respectively.

3. An indication display device for vehicles as claimed in claim 1, wherein height and width of said image projector means are predetermined such that a ceiling part is not reflected on said reflecting means from a position of a driver's eyes.

4. An indication display device for vehicles as claimed in claim 3, wherein said downwardly projecting ceiling can be a ceiling storage unit storing a room light, and an air cleaner.

5. An indication display unit for vehicles accordingg to claim 1 wherein said recessed hole having side surfaces which do not reflect light toward said reflecting means.

6. An indication display unit for vehicles according to claim 4 wherein said opening is mounted close to a forward edge of said ceiling storage unit so that said image projecting means is shaded.

* * * * *